Oct. 27, 1964 R. G. ALEXANDER, JR 3,154,765
THIN FILM MAGNETIC STORAGE
Filed March 31, 1958
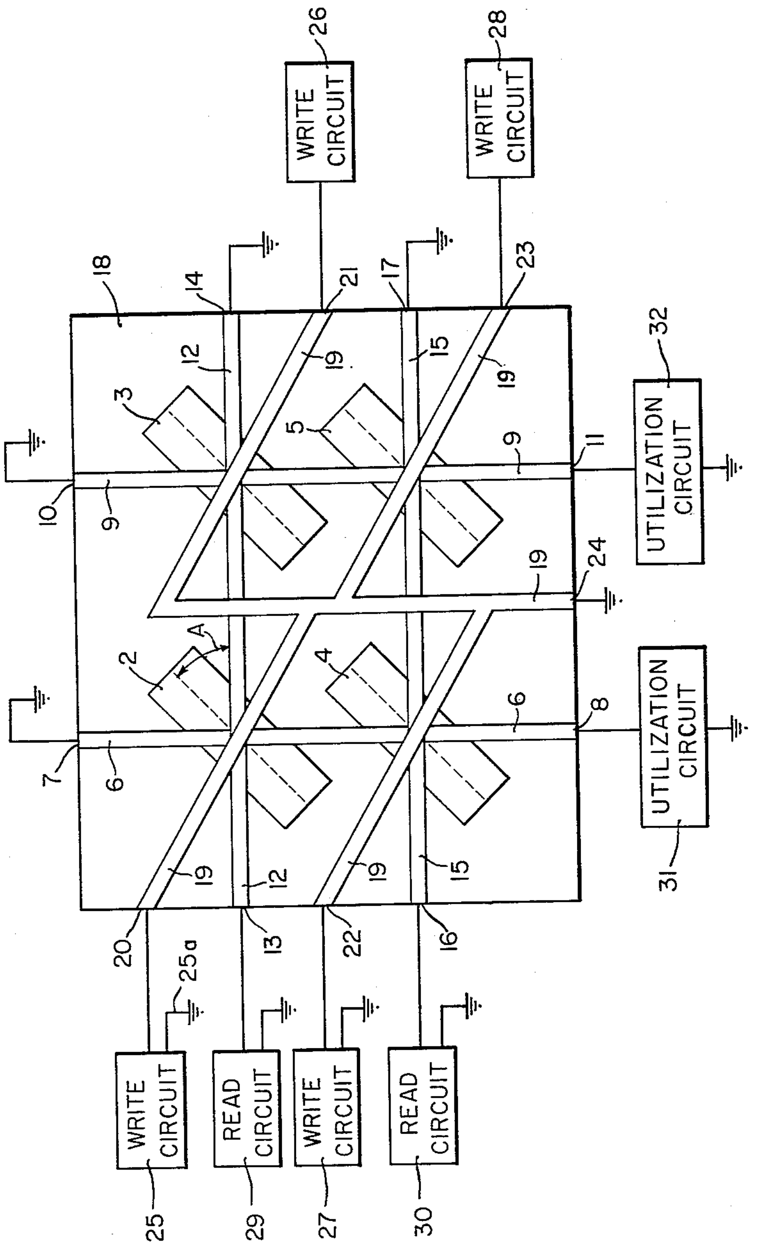
INVENTOR.
REXFORD G. ALEXANDER JR.
BY
Walter Schilpp
ATTORNEY United States Patent Office 3,154,765
Patented Oct. 27, 1964

3,154,765
THIN FILM MAGNETIC STORAGE

Rexford G. Alexander, Jr., Norristown, Pa., assignor to Burroughs Corporation, Detroit, Mich., a corporation of Michigan Filed Mar. 31, 1958, Ser. No. 725,337
20 Claims. (Cl. 340—174)

My invention relates to improvements in the art of magnetic element data storage devices.

It is known in the art of electrical computation and digital data processing and control to store information of a binary nature in a magnetic element having, preferably, two preferred directions of magnetizations, these directions having the same axis and differing only in direction or (analytically expressed) in algebraic sign. Magnetization in one such direction is arbitrarily assigned one significance, e.g. that of unity for the value of a binary digit to be represented. The other direction is then considered to represent the alternate value—zero, for the digit in the example. One way of using such a device is to set it to a reference condition and to arrange the circuitry so that if the digit to be stored has the reference value, the magnetic element is not affected; but if the digit has the alternate value the magnetization of the magnetic element, or core, is changed in sign. Usually information thus stored is recovered by applying to the core a field sufficient in direction and magnitude to restore it to the reference condition or to leave it in the reference condition. If the stored value was the alternate value, the core changes the sign of its magnetization and the flux reversal inherent in such change will induce a pulse of voltage in all conductors magnetically coupled to it, including the one producing the restoring field. If the stored value was the reference value, the core is very little affected by the restoring pulse, being driven slightly into saturation from its condition of remanence; the difference between remanence and saturation fluxes in many magnetic core materials commerically avaliable is only a tenth or less of the flux change produced in reversal from remanence of one sign to saturation of the other sign. Thus the change from remanence to saturation in the same direction is very easy to discriminate from complete reversal. Known methods of storing data, applying the restoring field, and detecting the flux reversal, if one occurs (these processes being often known respectively, as "writing," "restoring" and "sensing"), may employ one or more conductors for any one, any two, or all three of these functions.

Since a large capacity for storing data is a valuable property of a computing or data processing or control device, it is desirable for conservation of space to make the information storage cores small. This has the additional advantages of facilitating design for fast operation and reducing the power required to operate the core at a given speed. One satisfactory way of providing a large number of cores in small space is to employ films or layers of magnetic material having the properties before described, and to fix them in small strips or areas to a plane; magnetic coupling to these films is then effected by fixing conductors near them, without wrapping coils around the elements according to more conventional techniques of the power and communication arts, and without passing conductors through the magnetic elements according to the techniques of assembling toroidal cores into memory arrays. Either of these two latter techniques requires relatively elaborate and complex handling of the conductors. Such operations are more time-consuming and expensive than the simple fixing of conductors in proximity to the cores of the type I employ which, since they do not provide a complete flux path in themselves, are known as open cores. However, the use of a single conductor passing near a core does not give very strong coupling between the core and the conductor. It has therefore been customary in the design of such devices to strive for a maximum coupling between the conductors and the core by placing the conductors as close to the core as feasible and at right angles to the axis of the core, in order that a current in the conductors may produce a maximum magnetic field in the direction of the magnetic axis of the core, and that a maximum of flux from the core may link with the conductors. Such a configuration is described in "A Compact Coincident-Current Memory," by A. V. Pohm and S. M. Rubens, pp. 120–123, Proceedings of the Eastern Joint Computer Conference, December 10–12, 1956, New York, New York, published by the American Institute of Electrical Engineers, 33 W. 39th Street, New York 18, New York. It does indeed provide maximum coupling between the conductors and the core; but it has the defect that it provides strong coupling directly between the different conductors, apart from and in addition to that caused by the presence of ferromagnetic materials. Thus the application of a restoring pulse to one (or more than one) conductor will induce a large voltage pulse in such other conductors. This directly induced voltage pulse may be so large that it tends to conceal the voltage pulse produced by restoration of the core from the alternate to the reference condition and thus makes it difficult to determine if such restoration has or has not occured. This effect becomes increasingly troublesome as the speed of operation is increased, since faster restoration of a core requires an increased restoring field; thus the voltage pulse directly induced from one conductor to the other increases with increasing speed at a more rapid rate than the voltage induced by the flux reversal in the core. The masking thus becomes worse with increasing speed of operation. The reference cited includes the statement by Dr. Pohm (see Discussion at p. 123) that "The sense winding is essentially wound with zero mutual coupling to the drive, the only linkage that occurs between the two windings results from the presence of the elements." However, FIG. 4, p. 121 of the reference indicates, and the last sentence on p. 121 states, that "At the element positions, the horizontal, vertical, and inhibit conductors run parallel. . . ." What is indicated by these statements is that the winding is such that the air mutual inductance of given sign at the neighborhood of the core is cancelled by mutual inductance of opposite sign elsewhere. In general, cancellation of one large quantity by another large quantity of opposite sign requires very accurate control of both quantities, since a small alteration in either may increase their difference by many orders of magnitude.

My invention is based upon a recognition that maximum coupling between a magnetic core and the restoring and the sensing conductors is not necessarily beneficial if it causes the undesired or masking signal to be so large as to require the use of elaborate means for cancellation of such undesired signals in order to permit the presence or absence of the desired signal to be detected. Accordingly, I achieve desirable objects by departing from this conventional practice with respect to such coupling.

One object of my invention is to reduce unwanted and interfering signals generated in the output circuits of magnetic element data storage devices.

Another object is to reduce the effect upon the outputs of such devices of the reading pulses applied to inputs of such devices.

Another object is to decouple the various windings or conductors of such devices from each other without decoupling them from the magnetic elements whose condition of magnetization constitutes the actual record of the stored data.

Other benefits and objects of my invention will become evident in the course of the following description.

My invention is illustrated by a single figure of drawing which shows magnetic cores 2, 3, 4, 5, mounted on a non-magnetic base 18 which is preferably but not necessarily also nonconducting. While the cores are shown as being rectangular in shape, they may, if desired, be circular, oval or of irregular configuration; however, the core should not surround or enclose any of the conductors. And, while the cores may preferably be thin films, evaporated or otherwise deposited on the base 18, the cores may, if desired, have greater thickness—the particular dimensions, both as to thickness and area, depending upon the core material, operating speeds, and other parameters, according to the known art. The core material has a substatially rectangular B-H characteristic and each core has an axis of easy or preferred magnetization either as a result of its configuration or given it by stress or other known treatment. In the illustration, the axis of easy magnetization is the direction of the long dimension of the rectangular core, and is indicated in the drawing by the dashed line.

The description following assumes base 18 to be electrically insulating. The use of a base 18 electrically conducting requires all conductors to be insulated therefrom, as well as from each other and from cores 2, 3, 4 and 5.

Conductor 6, which in the drawing terminates at the edges of base 18 at points 7 and 8, passes over cores 2 and 4, preferably in close coupling thereto; and conductor 9, terminating in base 18 at 10 and 11, passes over and in close coupling to cores 3 and 5. Conductors 6 and 9 may be in actual contact with cores 2, 4 and 3, 5 respectively, but preferably are insulated therefrom by means not shown in order to reduce capacity effects. Conductor 12, terminating in base 18 at 13 and 14, passes over and in close coupling to cores 2 and 3 and also passes orthogonally (i.e. at right angles) across conductors 6 and 9, being electrically insulated therefrom (and also from conductor 19 whose function is later defined) by an insulating medium not shown in the drawing. Similarly, conductor 15, terminating in base 18 at 16 and 17, passes over in close coupling to cores 4 and 5 and also passes orthogonally across conductors 6 and 9, and across conductor 19 (but not orthogonally), being insulated from conductors 6, 9 and 19 by a medium not shown.

The angle between the axis of easy magnetization of any of the cores 2, 3, 4, 5, and the conductors 6 or 9 and 12 or 15 passing over the core is not a right angle, as is seen from the drawing, wherein the angle between the axis of one of the cores (core 2) and the conductor 12 is indicated by the letter A. The additional conductor 19, above referred to, has a plurality of branches (each in insulating relation to the conductors 6, 9, 12 and 15 which they cross) and terminating at the edges of base 18 at 20, 21, 22 and 23, and at a common end 24. Each of conductors 6, 9, 12, 15 and 19, may preferably be in the form of a flat strip, but other configurations may be used, if desired.

Included in the drawing are devices 25 to 32 inclusive, represented by rectangles and having functions indicated therein which will be discussed more fully later. Suffice to say at this point that devices 25 through 30 include current sources.

Consider now what happens when a current flows in conductor 12 from 13 to 14, i.e., from left to right in the drawing. A magnetic field will be produced around conductor 12 which will be generally directly upward, i.e. toward the top of the drawing, in the plane of cores 2, 3. It will have a component, however, along the axis of easy magnetization of core 2 which will be equal to its magnitude in the directly upward direction multiplied by the sine of the angle A. And it will have a component at right angles to the axis of easy magnetization of core 2, i.e. upward and to the left in the drawing, of a magnitude equal to the magnitude of the field in the directly upward direction multiplied by the cosine of the angle A.

If attention is now directed to conductor 6, it will be seen that if core 2 is magnetized along its axis of easy magnetization, the portion of its flux which is linked with conductor 6 will be approximately equal to the flux which would link conductor 6 if the angle A were zero multiplied by the cosine of the actual value of angle A. It will also be seen that current in conductor 12 can produce magnetic field components along the axis of easy magnetization of core 2, and that flux resulting from magnetization of core 2 along such axis can link conductor 6. While the cosine of angle A and the sine of angle A cannot both be equal to unity for a given value of A, a value of forty-five degrees for A makes both the sine of A and the cosine of A slightly greater than 0.7, and their product (which is a measure of the efficiency of this arrangement in producing output voltages for given input currents) has a value of one-half. The orthogonal relation of conductor 12 to conductor 6 will make the air mutual inductance between the two negligibly small; and, while the capacity between the two conductors cannot be reduced to zero by any possible orientation (other than to separate them by an infinite distance), the orthogonal attitude of the two minimize this capacity. Thus, interference by direct air inductive coupling between conductors 6 and 12 is made negligible and interference by capacitive coupling is reduced.

In operation at high speeds, the current at different parts of the same conductor may not always be of the same value, because of the finite propagation time of a current wave along the conductor. Thus, it is beneficial to eliminate, in detail, in accordance with my invention, the direct air mutual coupling between conductors at each core rather than to rely upon cancellation by coupling of opposite sign at a point where the current may not be the same as at the point where the voltage requiring cancellation is being induced. It is to be noted that in using my invention, it is not necessary to determine by calculation or by experiment how much coupling should be deliberately introduced to provide cancellation.

It is a property of a magnetic core, particularly if it is very thin, that it may reverse its magnetization by whole or partial rotation of the magnetic field around an axis which is normal to its plane, rather than by a simple decrease of magnetization in the original direction and a subsequent increase in the final direction. Either mode of reversal will (unless angle A be 90°) induce a voltage in the sensing conductor (6 or 9) located at right angles to the restoring or read conductor (12 or 15). The reference article by Pohm and Rubens hereinbefore mentioned describes the rotational phenomenon. While the waveform of the voltage induced in the sensing conductor will vary somewhat according to the exact mode of reversal of magnetization of the core and the value of angle A, a voltage will always be induced by such reversal (except as just noted above), which fact sufficies for the operation of the device of the present invention.

The device illustrated in the drawing operates in the following manner: From read pulse source 29 a positive pulse of current is applied to terminus 13 of conductor 12 and flows past cores 2 and 3 to terminus 14 and then to ground. The magnetic field generated by such a current pulse will cause cores 2 and 3 to be magnetized in a direction upward in the plane of the drawing and to the right along the axis of easy magnetization. From read pulse source 30 a positive pulse of current is applied to terminus 16 of conductor 15 and passes therealong to terminus 17 and then to ground, magnetizing cores 4 and 5 upwardly and to the right along the axis of easy magnetization. Thus, all cores are magnetized in the same initial reference direction.

Now, writing signal sources 25, 26, 27 and 28 may write-in information selectively to one or more of cores 2, 3, 4, and 5. Let it be assumed that a "one" (or alternate) signal is to be recorded in cores 2 and 5, and a "zero" (or reference) signal is to be recorded in cores 3 and 4. To effect this, writing signal source 25 is energized and drives a pulse of conventional current to ground 25a and draws a pulse of conventional current from terminus 20 of branched conductor 19, this current flowing in from ground at terminus 24 of conductor 19. This current flowing past core 2 from right to left magnetizes core 2 in a direction downward in the plane of the drawing and to the left. Writing signal source 28 is then energized (it might have been energized, if desired, simultaneously with source 25) and a pulse of conventional current is fed to terminus 23 of branched conductor 19, the current flowing out of terminus 24 to ground and back via ground to writing signal source 28. Such current pulse flowing from right to left past core 5 magnetizes core 5 downward in the plane of the drawing and to the left. In the present example, writing signal generators 26 and 27 are not required to generate any current pulses since the cores 3 and 4 have already been set to the restored or reference condition as hereinbefore described.

It will be noticed in the arrangement shown in the drawing that in order to magnetize cores 2, 3, 4 and 5 in a generally downward direction and to the left, as described above, this condition of magnetization being assumed to represent a "one" (or value alternate from reference) current must flow in the branches of write conductor 19 from right to left. Accordingly, whenever "ones" are to be written into cores 2 or 4, the respective writing signal generator 25 or 27, on the left side of the core matrix, is required to draw a current pulse from its ungrounded terminal and drive it to its grounded terminal (in other words, it is required to generate a negative pulse of conventional current at its ungrounded terminal) while writing signal generators 26 and 28, on the right side of the core matrix, must generate positive current pulses at their ungrounded terminals whenever they are to write "ones" into their respective cores 3, 5. It will also be seen that, if negative and positive current pulses are applied simultaneously to the branches of write conductor 19, as from write generators 25 or 27 and 26 or 28, only the algebraic difference between the negative and positive currents will flow in the common portion of conductor 19, as for example, between terminal 24 of conductor 19 and ground.

Conductors 6 and 9, previously referred to, function as the sensing leads for the core matrix. The various branches of write conductor 19 are shown in the drawing as not at right angles to sense conductors 6 and 9 even in the immediate vicinity of the cores 2, 3, 4, and 5. There will, therefore, be some direct air mutual inductance between branches of conductor 19 and sensing coductors 6 and 9. However, the application of a current pulse to a branch of write conductor 19 will (ordinarily at least) cause a change in the magnetization of the associated core and will thus cause induction in the associated sensing conductor of a voltage which at that time is not useful or desired. The utilization circuits 31, 32 associated with the sense conductors must, therefore, be gated or otherwise capable of ignoring pulses produced during the writing period so that induction of pulses in the sense leads by writing currents in conductor 19 will not be harmful to the operation of the system. It is, however, perfectly permissible, and within the contemplation of the present invention, for the writing leads, here shown as the various branches of write conductor 19, to be at right angles to the sense conductors 6 and 9; for example, they may be identical with the reading conductors 12 and 15 if the system circuitry and logic are compatible with such an arrangement.

It has been shown how "ones" (or signals alternate from "zero") may be selectively stored in cores 2 and 5, leaving "zeros" (or reference values) in the other cores, 3 and 4.

The information stored in the upper cores 2 and 3 may now be read out by causing read pulse generator 29 to drive a positive current pulse in at terminus 13 of conductor 12. As read current flows through conductor 12 from left to right, core 2 will be reversed from its "one" to its "zero" (reference) condition, thereby inducing in sense conductor 6 a voltage which drives current from utilizer 31 upward through conductor 6 to ground. The other core, core 3, will be driven only from "zero" remanence toward saturation, with small flux change, and the voltage induced in lead conductor 9 will be negligibly small, particularly since direct coupling between read conductor 12 and sense conductor 9 has been made small, in accordance with my invention, by the relative positions of the read and sense conductors. Thus, conductor 9 will deliver but negligibly small voltage to utilizer 32. At a desired other time, read pulse generator 30 may be caused to drive a positive current puse through read conductor 15 from left to right. Core 4 will be driven from "zero" (or reference) remanence toward saturation, with negligible flux change and negligibly small voltage induced in sense conductor 6. Core 5, however, will be reversed from its "one" to its "zero" (reference) condition, inducing in sense conductor 9 a voltage which drives current from utilizer 32 upward through conductor 9 to ground.

The techniques for sensing stored binary information are so well known that, in connection with the sense pulse utilizers 31, 32 it seems only necessary to say that they should be so constructed as to respond to voltages applied during the reading process, but not to the spurious voltages induced during the writing process. The art shows numerous techniques for so doing.

It is evident that the order of reading the information stored in the rows of cores may be as desired and different from that just described. Similarly, coincidence reading and writing techniques, well known in the art, may be applied without departing from the bounds of my invention.

It will also be understood that while the core matrix shown in the drawing includes but four cores, the technique of the present invention is useful in arrays comprising a great many more cores.

In the appended claims, the term "preferred axis of magnetization" is synonymous with the term "axis of easy magnetization" as used in the specification.

What is claimed is:

1. In a magnetic device for storage of binary data; an open-core magnetic element having a preferred axis of magnetization and being capable of assuming either of two stable states of magnetic remanence one of which is a reference state, and forming a magnetic circuit whose return path is through surrounding space; a restoring conductor having a portion oriented at an acute angle with respect to said preferred axis of magnetization and located in inductive coupling relation to said magnetic element for providing in response to current flow through said restoring conductor a magnetizing field capable of switching said magnetic element from its other to its reference state; and a sense conductor having a portion oriented with respect to said preferred axis at an angle which is the complement of said acute angle, said portion of said sense conductor being located in inductive coupling relation to said magnetic element, whereby a voltage is induced in said sense conductor in response to the switching of said magnetic element from either one to the other of its said states, said portion of said sense conductor being positioned in orthogonal relation with respect to said portion of said restoring conductor so as to have substantially zero air mutual inductive coupling therewith, whereby substantially no voltage is induced in said sense winding in response solely to the flow of current through said restoring conductor.

2. A magnetic device as defined in claim 1 including means for driving current of sufficient amplitude through said restoring conductor for causing independently the rotation of the magnetization of said magnetic element from its other state to its reference state.

3. In a magnetic device for storage of binary data; an open-core magnetic element having a preferred axis of magnetization and lying substantially in a plane, forming a magnetic circuit whose return path is through surrounding space and capable of assuming either of two stable states of magnetic remanence one of which is a reference state; a restoring conductor having a portion oriented at an acute angle with respect to said preferred axis of magnetization and located in a plane substantially parallel to that of said magnetic element and positioned in inductive coupling relation to said magnetic element for providing in response to current flow through said restoring conductor a magnetizing field capable of switching said magnetic element from its other to its reference state; a sense conductor having a portion oriented with respect to said preferred axis at an angle which is the complement of said acute angle, said portion of said sense conductor being located in a plane substantially parallel to that of said magnetic element and positioned in inductive coupling relation to said magnetic element, whereby a voltage is induced in said sense conductor in response to the switching of said magnetic element from either one to the other of its said states, said portion of said sense conductor being positioned in orthogonal relation with respect to said portion of said restoring conductor so as to have substantially zero air mutual inductive coupling therewith, whereby substantially no voltage is induced in said sense winding in response solely to the flow of current through said restoring conductor.

4. In a magnetic device as claimed in claim 3 characterized in that a utilization device is provided for utilizing the voltage induced in said sense winding in response to the switching of said magnetic element only from its other to its reference state.

5. In a magnetic device for storage of binary data; an open-core magnetic element occupying substantially a single plane, forming a magnetic circuit whose return path is through surrounding space, said element having a preferred axis of magnetization and being capable of assuming either of two stable states of magnetic remanence one of which is a reference state; a write conductor a portion of which is located in a plane substantially parallel to the plane of said magnetic element and being neither parallel nor orthogonal with respect to said preferred axis of magnetization, said portion of said write conductor being positioned in inductive coupling relation to said magnetic element for providing in response to current flow through said write conductor a magnetizing force capable of switching said magnetic element from its reference state to its other state; a read conductor a portion of which is oriented at an acute angle with respect to said preferred axis of magnetization and located in a plane substantially parallel to the plane of said magnetic element and positioned in inductive coupling relation to said magnetic element for providing in response to current flow through said read conductor a magnetizing force capable of switching said magnetic element from its said other state to its reference state; and a sense conductor having a portion thereof oriented with respect to said preferred axis at an angle which is the complement of said acute angle, said portion of said sense conductor being located in a plane substantially parallel to the plane of said magnetic element and positioned in inductive coupling relation to said magnetic element, whereby a voltage is induced in said sense winding in response to the switching of said magnetic element from either of said states to the other state, said portion of said sense conductor being positioned in orthogonal relation with respect to said portion of said read conductor so that substantially zero air mutual inductive coupling exists therebetween, whereby substantially no voltage is induced in said sense winding in response alone to current flow through said read conductor.

6. In the combination claimed in claim 5 characterized in the provision of utilization means coupled to said sense conductor for utilizing the voltage developed in said sense conductor in response to the switching of said magnetic element only from said other to said reference state.

7. In a magnetic device for storage of binary data; an open core magnetic element having a preferred axis of magnetization and being capable of assuming either of two stable states of magnetic remanence one of which is a reference state, and forming a magnetic circuit whose return path is through surrounding space; a write conductor a portion of which is oriented to be neither parallel nor orthogonal with respect to said preferred axis of magnetization and being located in inductive coupling relation to said magnetic element for providing in response to current flow through said write conductor a magnetizing force capable of switching said magnetic element from its reference state to its other state; a read conductor a portion of which is oriented at an acute angle with respect to said preferred axis of magnetization and located in inductive coupling relation to said magnetic element for providing in response to current flow through said read conductor a magnetizing force capable of switching said magnetic element from its said other state to its reference state; a sense conductor having a portion thereof oriented with respect to said preferred axis at an angle which is the complement of said acute angle, said portion of said sense conductor being located in inductive coupling relation to said magnetic element, whereby a voltage is induced in said sense winding in response to the switching of said magnetic element from either of said states to the other state, said sense conductor being positioned orthogonally with respect to said read conductor so that substantially zero air mutual inductive coupling exists therebetween, whereby substantially no voltage is induced in said sense winding in response alone to current flow through said read conductor.

8. The combination claimed in claim 7 characterized in the provision of utilization means coupled to said sense conductor for utilizing the voltage developed in said sense conductor in response to the switching of said magnetic element only from said other to said reference state.

9. The combination claimed in claim 7 characterized in that said magnetic element is a thin film of ferromagnetic material secured to a non-conductive, non-magnetic base, said film having a thickness of less than 10,000 angstroms.

10. A magnetic storage device comprising a matrix of open magnetic cores each forming a magnetic circuit whose return path is through surrounding space lying in a common core plane for electrical connection in an array of rows and columns, each core having a preferred axis of magnetization and being capable of assuming either of two stable states of magnetic remanence one of which is a reference state; a write conductor for each core, said write conductor having a portion oriented as to be neither parallel nor orthogonal with respect to said preferred axis of magnetization and being so located in a plane parallel to the plane of said core as to be in inductive coupling relation with said magnetic core for providing in response to current flow through said write conductor a magnetizing field capable of switching the magnetic core associated therewith from its reference state to its other state; a read conductor for all cores in the same row, said read conductor having portions each of which is oriented at an acute angle with respect to said preferred axis of magnetization and so located in a plane parallel to said core plane as to be in inductive coupling relation with each of said magnetic cores of said row for providing in response to current flow through said read conductor a magnetizing field capable of switching the magnetic cores of said row from their other state to their reference state;

a sense conductor for all cores in the same column, said sense conductor having portions each of which is oriented with respect to said preferred axis at an angle which is the complement of said acute angle, each of said portions of said sense conductor being so located in a plane parallel to said core plane as to be in inductive coupling relation with the magnetic cores of said column, said portions of sense conductor being, in the vicinity of the cores of said column, orthogonally oriented with respect to said portions of said read conductor so that substantially no inductive coupling exists therebetween, whereby when read current is passed through said read conductor a voltage is induced in said sense winding only in response to the switching of a core in the row associated with said sense winding, but whereby substantially no voltage is induced in said sense winding as a result only of the flow of said current through said read winding.

11. A magnetic storage device as claimed in claim 10 characterized in the provision of utilization means for utilizing the voltage induced in said sense winding in response to the switching of said magnetic element only from its other to its reference state.

12. The combination claimed in claim 10 characterized in that said magnetic cores are in the form of a thin fiilm of ferromagnetic material secured to a non-conductive non-magnetic base, said film having a thickness of less than 10,000 angstroms.

13. A device for storage of information of binary nature, comprising an array of substantially plane open-core magnetic elements having a return flux path through the surrounding space, each element having a preferred axis of magnetization and being capable of assuming either of two stable states, one of which is a reference state; means including a write conductor oriented so as to be neither parallel nor orthogonal with respect to said preferred axis of magnetization and being operatively connected for magnetizing selected ones of said elements in the state other than said reference state in accordance with the nature of individual items of information to be stored; means including a restoring conductor oriented at an acute angle with respect to said preferred axis of magnetization and operatively connected for restoring said selected magnetic elements to said reference state; and means including a sense conductor oriented with respect to said preferred axis at an angle which is the complement of said acute angle, and in which, in response to said restoration of a selected magnetic element to said reference state, a voltage is induced, said restoring and sense conductors being so oriented with respect to each other in the immediate vicinity of each of said magnetic elements that there is substantially no air magnetic flux directly linking said restoring and sense conductors.

14. A device as claimed in claim 13 characterized in that said restoring and sense conductors are mutually perpendicular to each other in substantially parallel planes in the immediate vicinity of each of said elements.

15. In a magnetic binary data storage device, a multiplicity of substantially plane open-core bistable magnetic elements each having a preferred axis of magnetization; first conductors lying parallel to the plane of said magnetic elements and having straight portions in the immediate vicinity of said magnetic elements which form an acute angle with said preferred axis of magnetization; second conductors lying parallel to the plane of said magnetic elements and having straight portions in the immediate vicinity of said magnetic elements which form with said preferred axis of magnetization an angle which is the complement of said acute angle; and means for driving a current pulse through a selected one of said first conductors for switching the magnetic elements which are in the said immediate vicinity of said first-conductor straight portions from one stable state to the other, thereby to induce a voltage in the second-conductor straight portions which are in said immediate vicinity of said switching elements.

16. In a magnetic device for storage of binary data; an open-core magnetic element capable of assuming either of two stable states of magnetic remanence one of which is a reference state, and forming a magnetic circuit whose return path is through surrounding space, said element comprising a thin film of magnetizable material and having a preferred axis of magnetization; a write conductor a portion of which is located in the immediate vicinity of said magnetic element and so positioned in a plane parallel to the plane of said magnetic element as to be neither parallel nor orthogonal with respect to said preferred axis of said magnetization, said portion of said write conductor being in inductive coupling relation with respect to said magnetic element so that in response to current flow therethrough a magnetizing force is applied to said magnetic element capable of switching said element from its reference state to its other state; a read conductor a portion of which is located in the immediate vicinity of said magnetic element and so positioned in a plane parallel to the plane of said magnetic element as to be neither parallel nor orthogonal with respect to said preferred axis of magnetization, said portion of said read conductor being in inductive coupling relation with respect to said magnetic element so that in response to current flow therethrough a magnetizing force is applied to said magnetic element capable of switching said element from its said other to its said reference state; a sense conductor a portion of which is located in the immediate vicinity of said magnetic element and so positioned in a plane parallel to the plane of said magnetic element that it is neither parallel nor orthogonal with respect to said preferred axis of magnetization but is substantially orthogonal with respect to said portion of said read conductor, said portion of said sense conductor being in inductive coupling relation with said magnetic element, whereby an appreciable voltage is induced in said sense winding in response to the switching of said magnetic element but substantially no voltage is induced in said sense winding in response solely to current flow through said read conductor.

17. In a magnetic device for storage of data comprising a plurality of bistable open-core magnetic elements each having a preferred axis of magnetization and being of substantially plane configuration in which, in the immediate vicinity of each magnetic element capable of being selectively magnetized to store the value of a given item of information having one of two possible values, there is provided a first conductor positioned at an acute angle with respect to said preferred axis of magnetization and so oriented in a plane substantially parallel to that of said element that by passage of current through said conductor a magnetizing field is provided capable of driving the said magnetic element to a reference magnetic state, and a second conductor positioned with respect to said preferred axis at an agle which is the complement of said acute angle and so oriented in a plane substantially parallel to that of said first conductor that there is substantially no air magnetic flux directly linking said second and said first conductors, said second conductor having non-zero mutual inductance with respect to said first conductor solely through the magnetic flux changes produced in said magnetic element by current flow through said first conductor.

18. The combination claimed in claim 17 characterized in that said magnetic element is a thin film of ferromagnetic material having a thickness of less than 10,000 angstroms and having a preferred axis of magnetization.

19. A memory device comprising: a multiplicity of ferromagnetic elements each having two stable conditions of magnetization along a preferred direction of magnetization, each said element constituting an open magnetic circuit with the return magnetic flux path through the space around the said element; conductor writing means oriented as to be neither parallel nor orthogonal with respect to said preferred direction of magnetization and operatively connected for selectively applying to each said element by passage of current therethrough a magnetizing field adapted to place the said element in a first state of magnetization; conductor reading means oriented at an acute angle with respect to said preferred direction of magnetization and operatively connected for selectively applying to each said element by passage of current therethrough a magnetizing field adapted to place the said element in a second state of magnetization; conductor sensing means oriented with respect to said preferred direction at an angle which is the complement of said acute angle and adapted to link with the flux through a said element and part of the return flux through the space adjacent to the said element and orthogonal to said conductor reading means in the immediate vicinity of the said element.

20. A data storage device comprising: a multiplicity of ferromagnetic elements each having two stable conditions of magnetization parallel to a substantially straight line defining a preferred direction of magnetization and each said element constituting an open magnetic circuit with the return magnetic flux path through the space external to the said element; conductor writing means oriented as to be neither parallel nor orthogonal with respect to said preferred direction of magnetization and operatively connected for selectively applying to each said element, by passage of current through said conductor writing means, a magnetizing field adapted to place the said element in a first stable state of magnetization; conductor reading means oriented at an acute angle with respect to said preferred direction of magnetization and operatively connected for selectively applying by passage of current therethrough a magnetizing field adapted to place the said element in a second stable state of magnetization; conductor sensing means oriented with respect to said preferred direction at an angle which is the complement of said acute angle, said conductor sensing means being located between each said element and a part of the return magnetic flux path of said element so as to link with some of the said magnetic flux, and having substantially no direct air magnetic flux linkages with the portion of said conductor reading means in closest proximity to said element.

References Cited in the file of this patent

UNITED STATES PATENTS

| | | |
|---|---|---|
| 2,691,156 | Saltz | Oct. 5, 1954 |
| 2,811,652 | Lipkin | Oct. 29, 1957 |
| 2,846,673 | Gray | Aug. 5, 1958 |
| 2,997,695 | Conger | Aug. 22, 1961 |
| 3,030,612 | Rubens | Apr. 17, 1962 |
| 3,092,812 | Rossing | June 4, 1963 |

FOREIGN PATENTS

| | | |
|---|---|---|
| 763,038 | Great Britain | Dec. 5, 1956 |

OTHER REFERENCES

Publication: "Preparation of Thin Magnetic Film and Their Properties," by M. S. Blois, Journal of Applied Physics, vol. 26, No. 8, August 1955.

Publication: "A Compact Coincident-Current Memory," by Pohm and Rubens, published in Proceedings of Eastern Joint Computer Conference, December 10–12, 1956, pp. 120–123.